United States Patent Office.

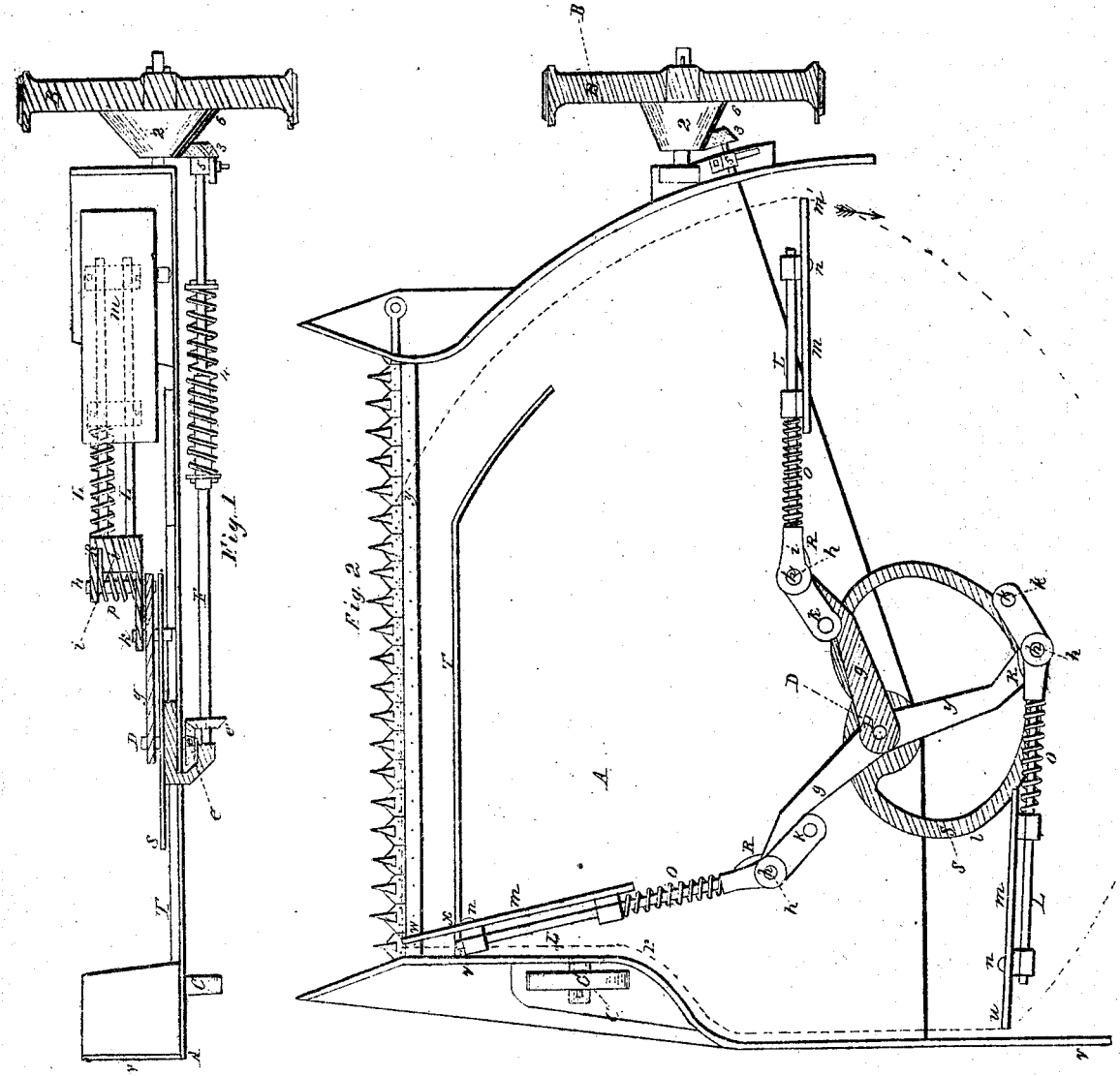

ISRAEL LANCASTER, OF BALTIMORE, MARYLAND.

Letters Patent No. 80,188, dated July 21, 1868.

---

IMPROVEMENT IN HARVESTER-RAKES.

---

The Schedule referred to in these Letters Patent and making part of the same.

---

TO ALL WHOM IT MAY CONCERN:

Be it known that I, ISRAEL LANCASTER, of Baltimore, in the county of Baltimore, and State of Maryland, have invented a new and improved Harvester-Rake; and I do hereby declare that the following is a full and exact description thereof, reference being had to the accompanying drawings, and to the letters of reference marked thereon.

The nature of my invention consists in the construction of a side-delivery harvester-rake, to apply to the platform of a reaping-machine, and which discharges the grain in gavels suitable for binding; and also in a peculiar device for communicating motion from the driving-wheel of the harvester to the rake, by which its speed is regulated to suit heavy or light grain.

To enable others skilled in the art to make and use my invention, I will proceed to describe its construction and operation.

Figure 1 is an elevation of the different parts of the entire mechanism, seen from the rear of the harvester.

Figure 2 is a plan of the platform and rake seen from above.

A, fig. 2, is the platform of the harvester.

B is the driving-wheel.

C is the grain-wheel.

At D, figs. 1 and 2, is seen a short vertical shaft, placed upon the rear of the platform A, and passing through it. To the lower end of this shaft is attached the bevel-gear E, which is actuated by a similar gear, E', on the shaft F, which communicates with the driving-wheel B.

To the upper end of D is fastened the arm $g$, by one of its ends, while to the other end is fastened the vertical pin $h$. Upon this pin is placed the rake-shank or base, which is an angular block, seen at $i$. To the lower arm of this block is fastened a pin, projecting downward, seen at $k$.

The two rods L L are fastened to the block $i$, and upon them slides the rake-head $m$, in the direction of its length. The head $m$ is provided with a pin, $n$, projecting downward. The rake-head $m$ is constantly thrust outward by the coiled spring O, working on one of the rods L.

On the pin $h$ is placed the coiled spring $p$, one end of which is fastened to the pin $h$, and the other made to rest on the side of the block $i$ at R. This spring holds the rake in the position seen at fig. 2, during a part of its revolution, with the pin $k$ resting against the side of the arm $g$.

At S is seen a guide-bar, fastened to the platform A.

At T is seen a strip, projecting about three inches above the platform, and placed parallel to the cutter-bar. The cut grain falls on top of this strip.

The operation of this rake is thus explained:

The path of the rake is in a horizontal plane parallel to the platform A. When it has arrived at the position seen at fig. 2, $m'$, the sheaf is discharged. On rotating still further in the direction of the arrow, the pin $k$ strikes the edge of the guide-bar S, the spring $p$ at R is forced back, and the rake is thrown round in the path shown by the dotted red line, the end of the rake, at $u$, passing down the dividing-board $v v$ to the point $w$. The pin $n$ then strikes the side of the strip T at $x$, forcing back the rake-head M on the spring O, thus causing the end at $u$ to cross the platform in a straight line as far as the point $y$, when its path becomes circular until its arrival at the starting-point.

When the point $u$ arrives at $z$, the pin $k$ leaves the guide-bar S at 1, when the spring R keeps the head of the rake, at $u$, against the dividing-board $v v$ until its arrival at $w$, when the pin $k$ strikes the arm $g$ again, and the rake is firmly held while raking the sheaf.

It will be seen that this movement takes the rake out of the way of the falling grain while it is returning to the point $w$, after having discharged the sheaf.

I experienced two difficulties in operating this rake.

The first was the fact that some part of the mechanism would give way if an impediment of any kind sufficient to stop the rake were to occur when the rake was geared to the driving-wheel B in the ordinary manner.

The second was the difficulty of adjusting the motion of the rake to suit heavy or light grain. I remedy these difficulties as follows:

At 2 is a smooth cone on the shaft of the driving-wheel B. At 3 is a bevelled wheel, whose face presses against the face of 2. The face of this wheel is covered with leather or some preparation of India rubber, to increase the friction with the cone 2. The wheel 3 is fastened to one end of the shaft F, which actuates the rake. This shaft is made with a telescopic slide, and is furnished with a strong spiral spring, 4, which constantly presses the face of the wheel 3 against the face of the cone 2. The bearing, 5, is adjustable, and when moved to the rear, permits the wheel 3 to move further up the cone 2, as far as the point 6.

It is evident that the nearer the point 6 the wheel 3 is placed, the more rapid will be the revolution of the shaft F, and consequently the rake also. The motion of the rake can thus be varied within any desired limits, by moving the bearing 5. It is also easy to attach the bearing 5 to a lever that could be operated by the hand of the driver, provided the increased mechanism would be compensated by the care with which the adjustment could be effected.

In any accidental stoppage of the rake the cone 2 would slip upon the wheel 3, thus preventing breakage.

Having thus described the construction and operation of the different parts of the mechanism, what I consider as of my invention, and desire to secure by Letters Patent, is—

1. The spring O, rake-head $m$, pin $n$, and strip T, acting in combination, when used to regulate the movement of the rake-head when passing over the cutter-bar, and when constructed and operating substantially as described.

2. The arm $g$, provided with the pin $h$, in combination with the pin $k$ and block $i$, which supports the rake $m$, constructed and operating substantially as described, and for the purpose mentioned.

3. The arm $q$, provided with the pin $p$, the block $i$, provided with the pin $k$, and the guide-bar S, acting in combination, when used to effect the purpose mentioned, and when constructed substantially as described.

ISRAEL LANCASTER.

Witnesses:
F. W. PLUMMER,
H. A. LANCASTER.